TWO-PIECE CONSTRUCTION FOR UHF TELEVISION TUNER

Filed May 26, 1967 6 Sheets-Sheet 1

INVENTORS
ROBERT H. REDFIELD
JOHN L. FRANKE
BY
OSTROLENK, FABER, GERB & SOFFEN
ATTORNEYS

TWO-PIECE CONSTRUCTION FOR UHF TELEVISION TUNER

INVENTORS
ROBERT H. REDFIELD
BY JOHN L. FRANKE

OSTROLENK, FABER, GERB & SOFFEN
ATTORNEYS

TWO-PIECE CONSTRUCTION FOR UHF TELEVISION TUNER

Filed May 26, 1967 6 Sheets-Sheet 4

INVENTORS
ROBERT H. REDFIELD
JOHN L. FRANKE
OSTROLENK, FABER, GERB & SOFFEN
ATTORNEYS

Aug. 11, 1970 R. H. REDFIELD ET AL 3,524,137

TWO-PIECE CONSTRUCTION FOR UHF TELEVISION TUNER

Filed May 26, 1967 6 Sheets-Sheet 5

INVENTORS
ROBERT H. REDFIELD
JOHN L. FRANKE
BY
OSTROLENK, FABER, GERB & SOFFEN
ATTORNEYS

Aug. 11, 1970 R. H. REDFIELD ET AL 3,524,137

TWO-PIECE CONSTRUCTION FOR UHF TELEVISION TUNER

Filed May 26, 1967 6 Sheets-Sheet 6

INVENTORS
ROBERT H. REDFIELD
JOHN L. FRANKE
By
OSTROLENK, FABER, GERB & SOFFEN
ATTORNEYS

United States Patent Office 3,524,137

Patented Aug. 11, 1970

3,524,137

TWO-PIECE CONSTRUCTION FOR UHF TELEVISION TUNER

Robert H. Redfield, Evanston, and John L. Franke, Chicago, Ill., assignors to Standard Kollsman Industries, Inc., Melrose Park, Ill., a corporation of Illinois Filed May 26, 1967, Ser. No. 641,654
Int. Cl. H03j 3/02; H04b 1/08
U.S. Cl. 325—357 9 Claims

ABSTRACT OF THE DISCLOSURE

UHF tuner sub-assembly constructions in which all the electrical circuit components are mounted to accessible regions of a single sub-assembly which is then interconnected in nested engagement with a cooperating sub-assembly, devoid of electrical circuit components, the two principal sub-assemblies cooperatively providing compartmentalized or isolated circuit sections.

Our invention relates to UHF television tuners of a compartmentalized construction, in which all of the electrical circuit components are mounted to a single sub-assembly formed as an integral unit, for subsequent interconnection, in nested arrangement, with another sub-assembly and associated structure, cooperatively defining the compartment boundaries. More specifically, our invention relates to further improvements in the general type of UHF television tuner construction, which is the subject of U.S. Pat. No. 3,181,069, issued Apr. 27, 1965 to Robert C. A. Eland, entitled "UHF Television Tuner" and assigned to the assignee of the instant invention.

UHF television tuners generally include a tuned antenna input or R-F selector stage, an oscillator stage, and a mixer stage. These stages are gang tuned for receiving selected broadcast signals in the range of 470–890 megacycles, and heterodyning these signals down to a substantially lower common receiver IF frequency. In order to minimize extraneous interference, it is the conventional practice to include the circuit components within an enclosed metal chassis. This chassis is compartmentalized to isolate the respective circuit sections.

In the past, it has been the general practice to first form the compartmentalized section and then assemble all the individual circuit components thereto. However, since many of the circuit components must be located at relatively inaccessible positions of the final chassis assembly, this arrangement has been found to be quite tedious and time-consuming, thereby causing many practical manufacturing difficulties. These typical prior art problems are avoided to some extent by the UHF tuner asembly structure, which is the subject of aforementioned U.S. Pat. No. 3,181,069. That patent discloses a sub-assembly concept wherein two principal sub-assemblies are separately constructed, each including a portion of the electrical circuit components. These principal sub-assemblies are then separately tested and electrically and mechanically interconnected. Thus, while this arrangement permits a substantially greater number of the electrical circuit components to be mounted and interconnected while accessible, it disadvantageously requires that there be two separate sub-assemblies and testing set-ups for each of the principal sub-assemblies.

The UHF tuner structures of our invention avoid these problems and provide an even greater cost saving and simplification of manufacturing techniques by mounting all the electrical circuit components to a single sub-assembly. Such a single sub-assembly is so constructed and the electrical circuit components located thereon so as to enhance the accessibility thereto during the manufacturing operation. After such principal sub-assembly is tested, it is then cooperatively interconnected with the other principal sub-assembly, which is devoid of electrical circuit components, and includes cooperating walls required to provide the desired compartmentalized UHF tuner arrangement.

In accordance with a further advantageous feature of the embodiments of our invention, all of the chassis sub-assemblies are formed of stampings from a single sheet of material, with right angle bends being provided at the intersection of its respective walls. Means, such as cooperating tabs and slots, are provided, for properly locating the individual sub-assemblies relative to each other, with the nested engagement of the sub-assemblies being made secure, as by soldering.

It is therefore seen that a principal object of our invention is to provide a UHF television tuner of simplified assembly.

Another object of our invention is to provide a novel UHF tuner assembly, of the sub-assembly variety, in which all of the electrical circuit components are mounted to accessible regions of a single sub-assembly.

A further object of our invention is to provide a compartmentalized UHF television tuner, which includes longitudinal walls, and a transversely extending top wall, with all of the electrical circuit components being mounted to the top wall and the longitudinal wall portions carried by a single sub-assembly.

Still an additional object of our invention is to provide a compartmentalized UHF television tuner, which is formed of a single stamping of sheet material, and contains all the electrical circuit components of the tuner.

Two illustrative embodiments of UHF television tuners constructed in accordance with the above objects are illustrated. It should, however, be understood that various other modifications may be practiced within the breadth of the herein described inventive concept.

In one of the embodiments, the principal sub-assembly includes the top wall and the intermediate longitudinal walls which form the partitions between the respective compartments. This principal sub-assembly is in the form of a double T-like configuration. The cooperating sub-assembly including the longitudinal end walls, rear wall spanning therebetween, and preferably the bottom wall.

In accordance with another embodiment of our invention which has been found to conveniently permit a general decrease in overall size, the principal sub-assembly includes the top wall, one of the compartment partition walls, and the longitudinal end wall farthest displaced therefrom. This sub-assembly includes all the electrical components, as well as a portion of the rear wall spanning between the above-noted longitudinal walls. The cooperating sub-assembly includes at least a portion of the other partition wall, as well as the remaining side wall, interconnected by a section of the rear wall. If desired, the bottom wall may also be integrally formed with this second section. Appropriate cutouts and slots are provided on the housing sections, to provide guide means for properly locating and seating the sections. Also, the signal coupling aperture between the antenna-input and mixer sections is illustratively shown as being formed by interengaging portions of the partition separating wall carried by the first and second sub-assemblies.

The embodiments of the instant invention for accomplishing the aforementioned objects are now described with reference to the following drawings, in which.

1, showing the addition of the input drive shaft and associated gearing.

Figure 5:
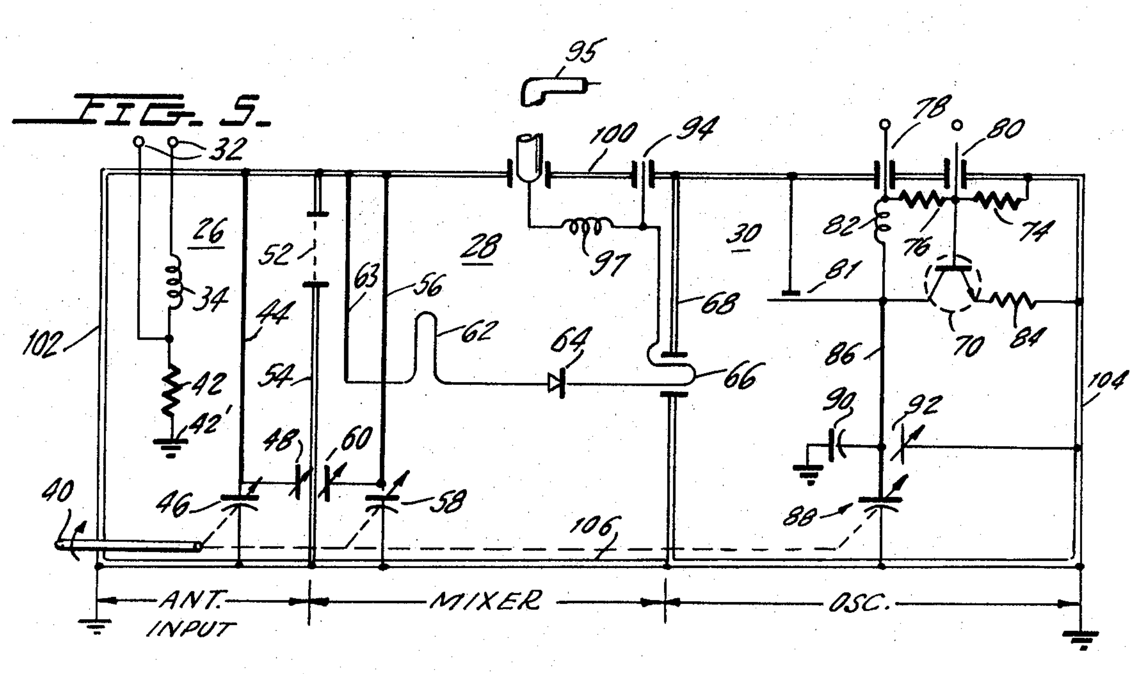

FIG. 5 is a typical circuit diagram of the tuner.

Figure 6:
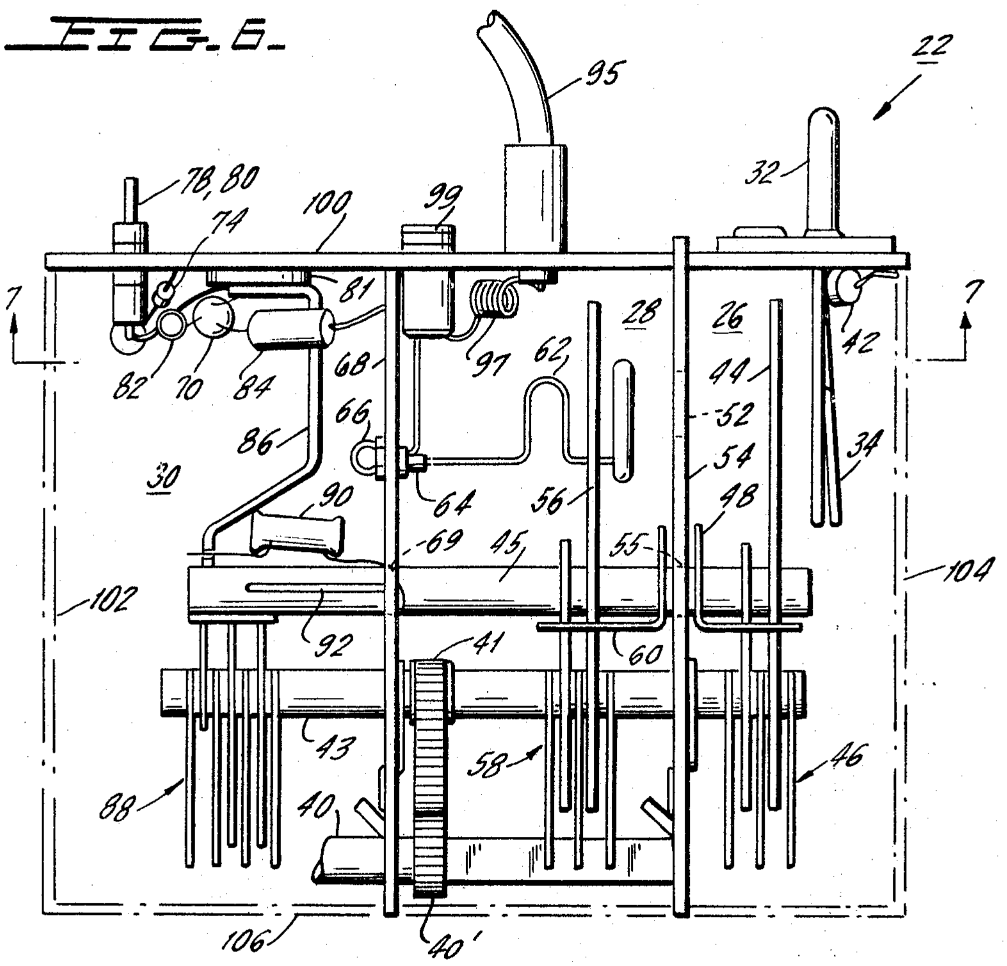

FIG. 6 is a front elevational view of the fully fabricated principal sub-assembly, containing all of the electrical circuit components, with the wall portions of the cooperating sub-assembly being shown by dot-dash lines.

Figure 7:
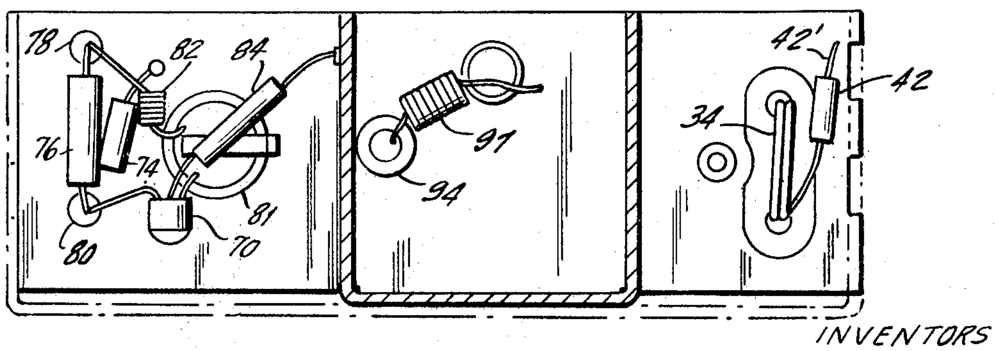

FIG. 7 is a view along the line 7—7, showing the location of some electrical circuit components along the underside of the tuner top wall.

Figure 9:
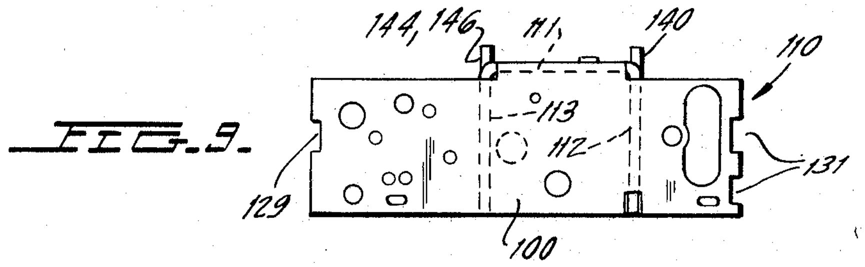
Figure 10:
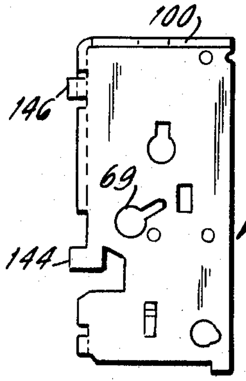
Figure 8:
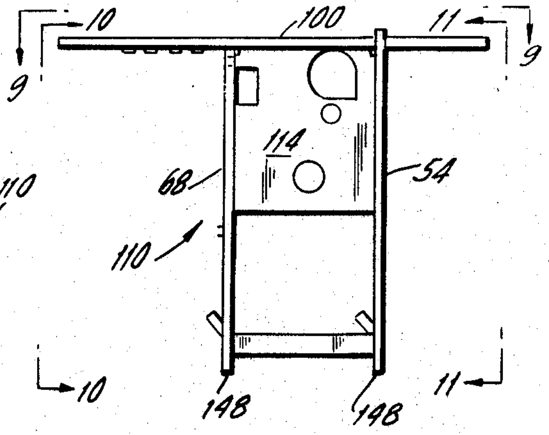
Figure 11:
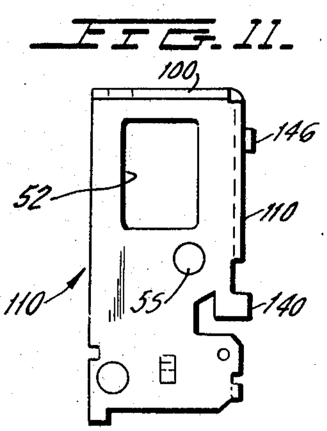

FIGS. 8–11 illustrate the single stamping which forms the chassis for the principal sub-assembly, with FIG. 8 being a front elevational view thereof, FIG. 9 a plan view along the line 9—9 of FIG. 8, and FIGS. 10 and 11 being end views as designated by the respective lines of FIG. 8.

Figure 14:
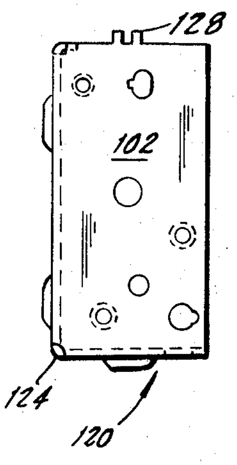
Figure 12:
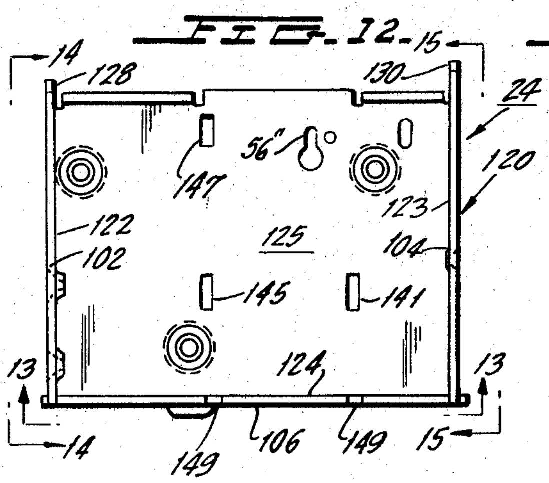
Figure 15:
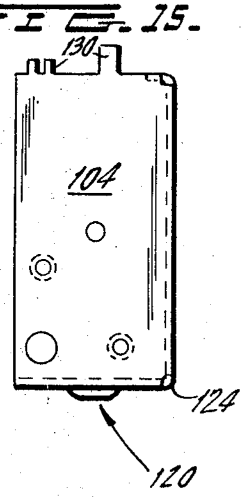
Figure 13:
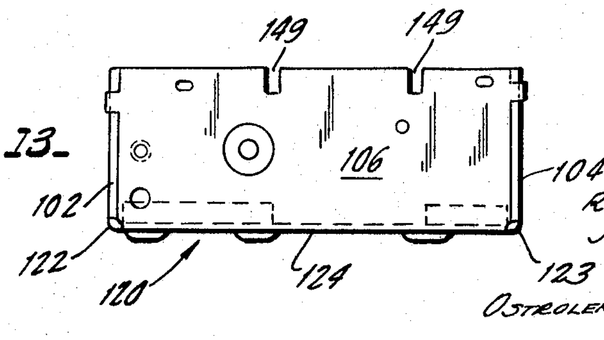

FIGS. 12–15 show the single stamping which forms the mating sub-assembly for completing the overall UHF tuner assembly, with FIG. 12 being a front view, and FIGS. 13, 14 and 15 being plan and end views respectively, as shown by the arrow designations of FIG. 12.

Figure 16:
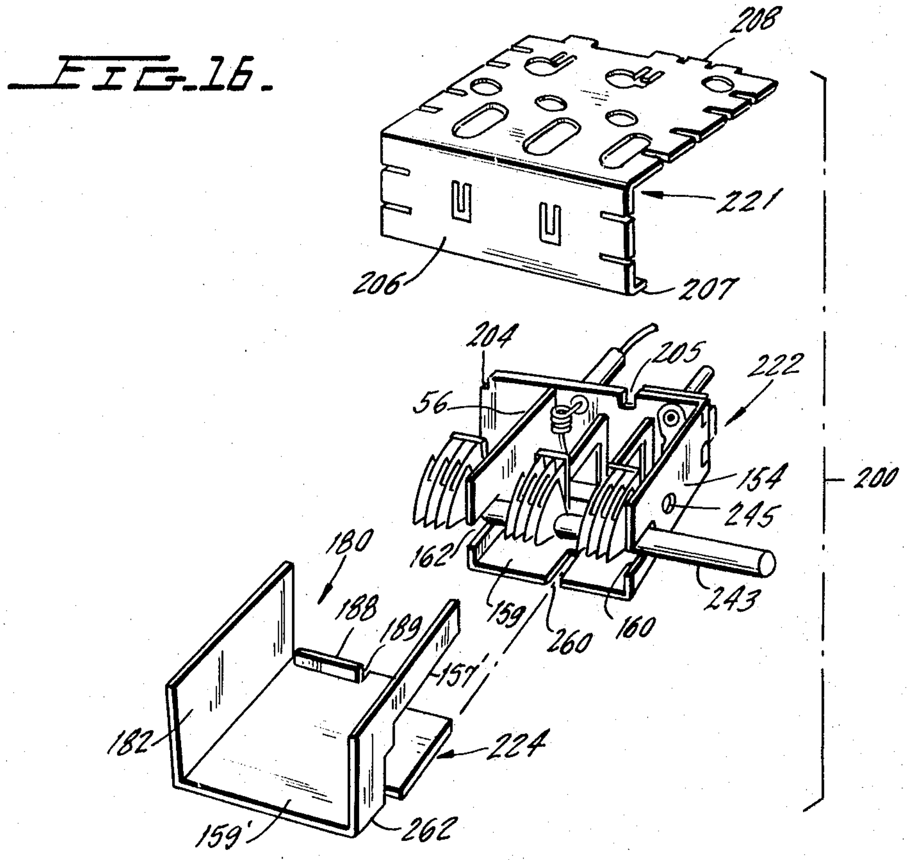

FIG. 16 is an exploded perspective view of another form of our invention, showing the inter-relationship of the principal sub-assemblies and enclosing cover.

Figure 17:
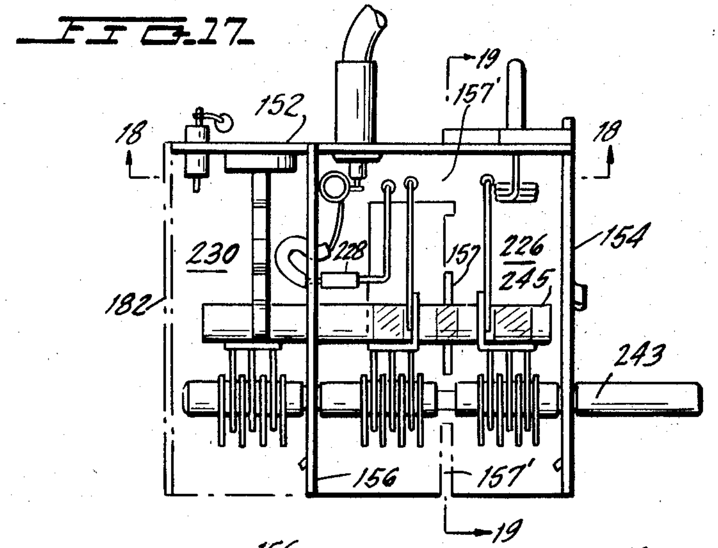

FIG. 17 is a front elevation view of the fully fabricated principal sub-assembly of FIG. 16, containing all the electrical circuit components, with the wall portions of the cooperating sub-assembly being shown by dot-dash lines.

Figure 18:
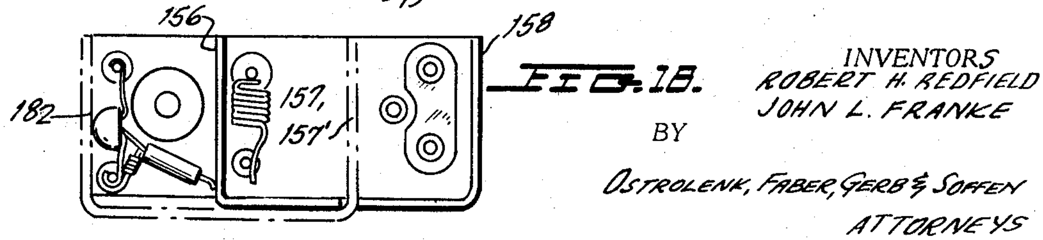

FIG. 18 is a view along the line 18—18 of FIG. 17 and showing the disposition of some of the electrical circuit components along the underside of the tuner top wall.

Figure 19:
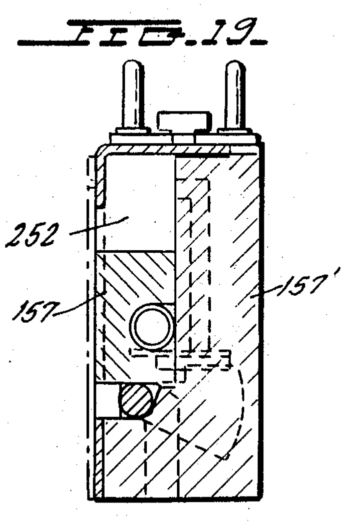

FIG. 19 is a view along the line 19—19 of FIG. 17 and showing the manner in which the sub-assemblies inter-engage along one of the compartment partition walls to provide a signal coupling aperture.

Figure 21:
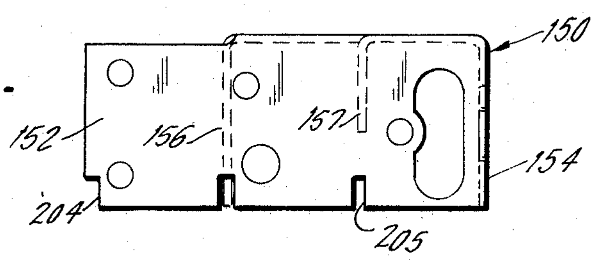
Figure 22:
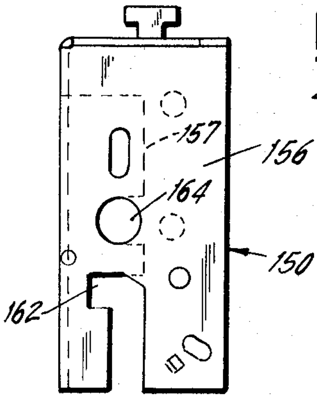
Figure 20:
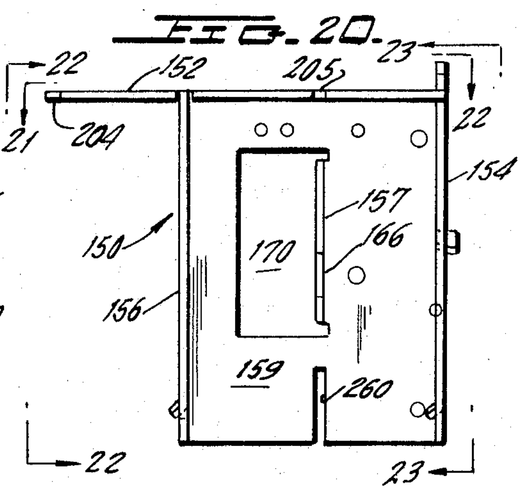
Figure 23:
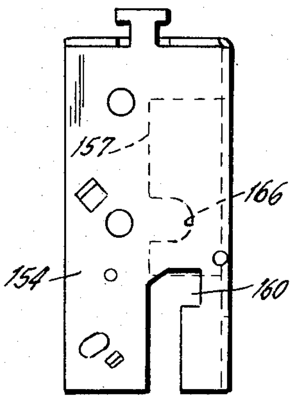

FIGS. 20–23 show the stamping members forming the principal sub-assembly shown in FIG. 17. FIG. 20 is a front elevational view, and FIGS. 21, 22 and 23 are plan and end views respectively, looking in the directions of the arrow designations of FIG. 20.

Figure 24:
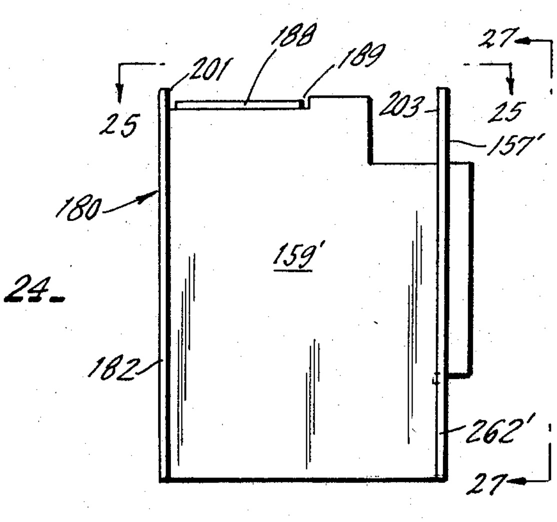
Figure 26:
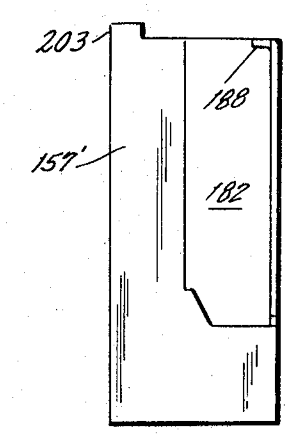
Figure 25:
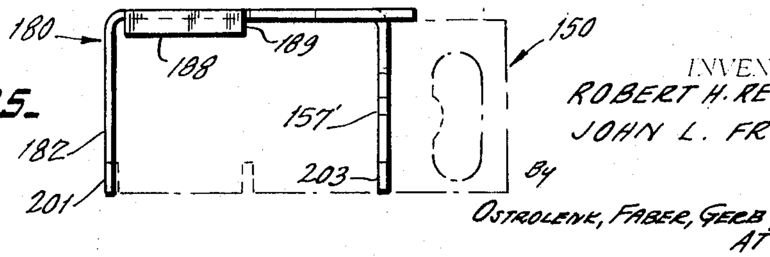

FIGS. 24–26 show the cooperating stamping which inter-engages the principal sub-assembly to provide the compartmentalized tuner, as shown in FIG. 17; FIG. 24 is a front profile view, FIG. 25 is a top view, and FIG. 26 is an end view, looking in the directions of the respective arrow designations of FIG. 24.

Referring initially to the embodiment of FIGS. 1–15, UHF tuner 20 is formed of two principal sub-assemblies, generally shown as 22, 24, respectively, which are nested together and inter-engage to form first, second and third shielded compartments 26, 28, 30 respectively. These shielded compartments contain the antenna-input, mixer and oscillator stages of the tuner. The inter-engaged sub-assemblies are then fully enclosed by front cover 21.

The R-F signal input, within the range of 470–890 megacycles, is applied to antenna terminals 32, which connect to input coil 34. The various stages of the tuner are appropriately frequency adjusted by means of a ganged variable condenser 46–58–88. The manual input is presented to rotatable shaft 36, which is coupled via gearing 38 (preferably of the anti-backlash type) to rotor drive shaft 40. Rotor drive shaft 40 includes output gear 40′, which drives sector gear 41, keyed to rotor plate shaft 43 of the ganged variable condenser. The cooperating stator plates are supported by ceramic rod 45, mounted to suitable apertures 55, 69, in the partition walls 54, 68 respectively. Temperature compensation of the variable condenser may be obtained in the manner described in Eland U.S. Pat. No. 3,242,432.

In accordance with the improved construction of our invention, all the electrical circuit components, as schematically shown in FIG. 5, are mounted to sub-assembly

22, with the completely fabricated sub-assembly being illustrated by the solid lines of FIG. 6.

Figure 1:
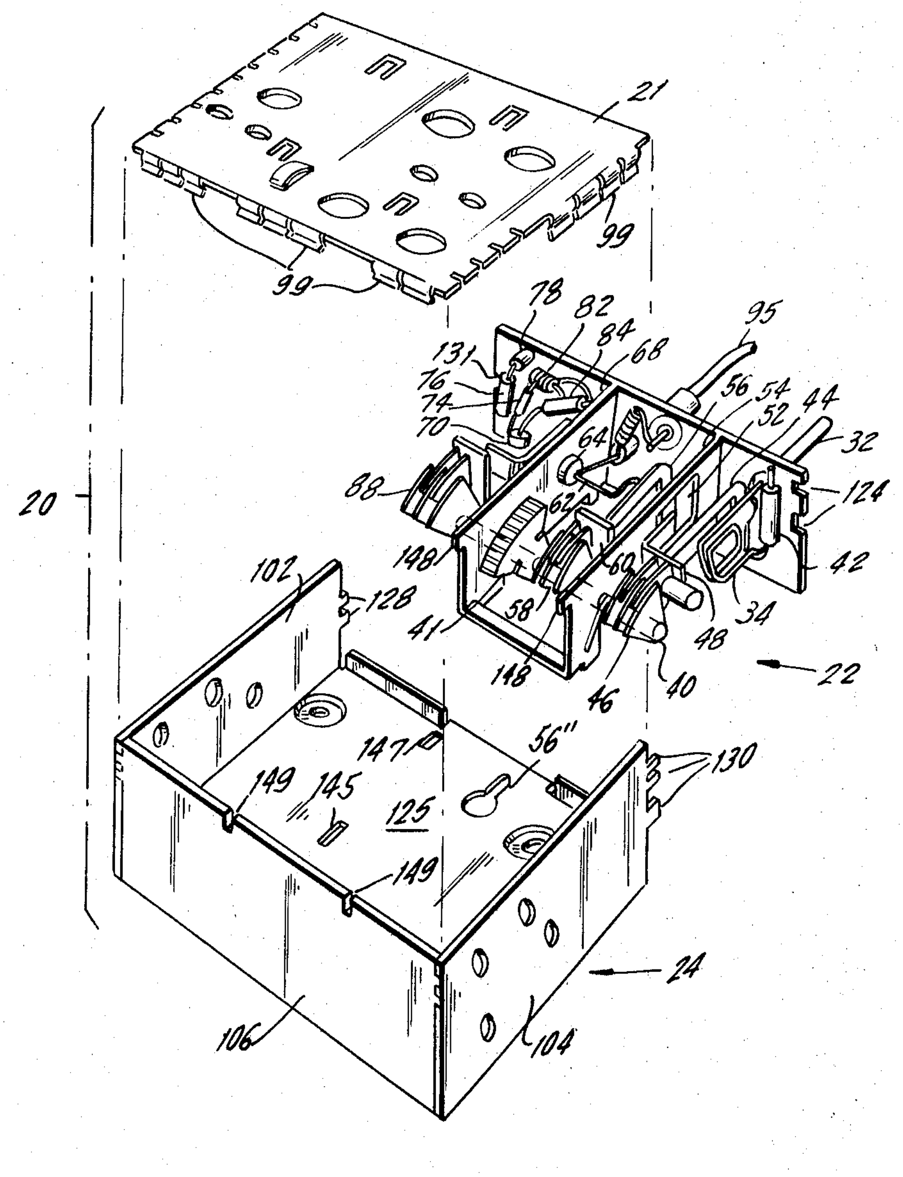
FIG. 1 is an exploded perspective view showing the inter-relationship of sub-assemblies and enclosing cover in accordance with one form of our invention.
Figures 2, 3:
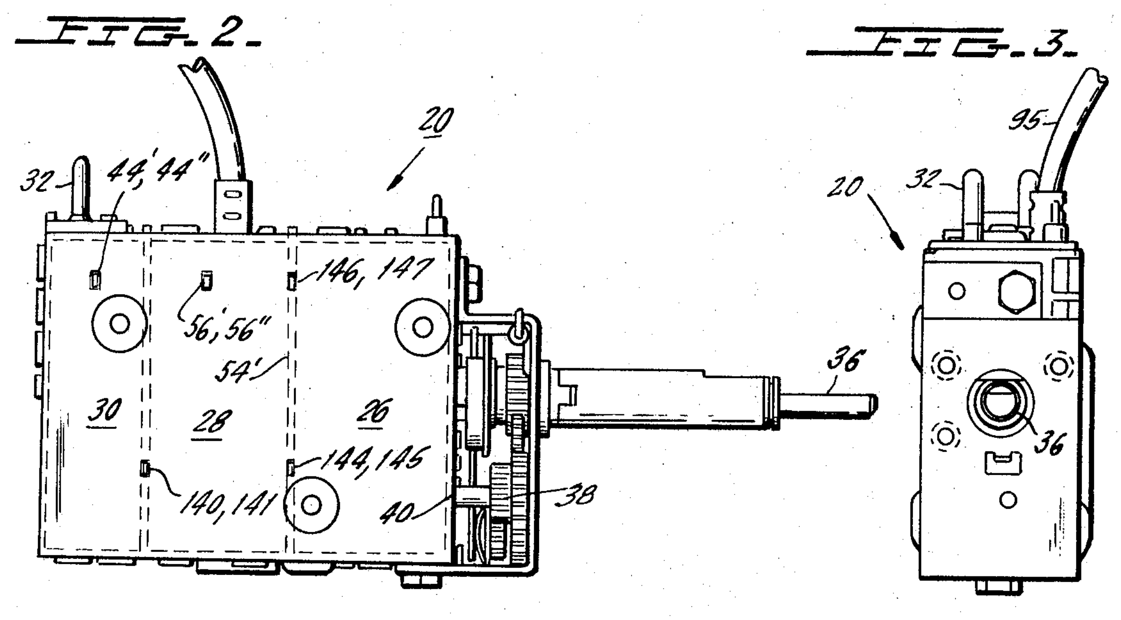
FIGS. 2, 3 and 4 are rear, end and top views respectively of the fully assembled tuner embodiment of FIG.
Figure 4:
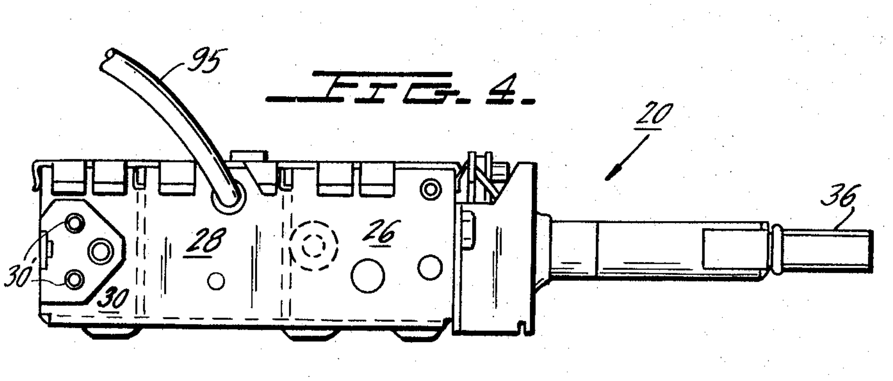

The circuit of FIG. 5 is a conventional UHF tuner, and a detailed operating description thereof is not believed to be necessary for an understanding of our inventive contributions. The physical layout of circuit components is best shown in FIGS. 1, 6 and 7. Referring to these figures in conjunction with FIG. 5, the antenna input coil 34 has one end thereof connected to an isolation resistor 42, the other end of which is connected to ground. The antenna input compartment 26 further includes an R-F inductance line 44, variable capacitor section 46 and an R-F trimmer capacitor 48.

The preselected signal within the tuned antenna compartment 26 is coupled to the mixer compartment 28 via an aperture 52 within longitudinally extending common partition wall 54. The mixer compartment 28 includes a tuned line-variable condenser arrangement 56, 58 and trimmer condenser 60. Mixer loop 62 is connected to the mixer diode 64.

The oscillator compartment 30 includes transistor 70, which is connected in a grounded base arrangement. The voltage bias network for the transistor stage is provided by resistor 74 intermediate the base terminal of the transistor and the chassis, and resistor 76 which is connected from the base terminal of the transistor to the B+ input via transistor bias feedthrough capacitor 78. Another feedthrough condenser 80 is connected to the base terminal of the transistor. The choke 82 is connected between the transistor collector terminal and the B+ input. The oscillator section further includes inductance line 86, ganged condenser section 88, fixed collector capacitor 81, high temperature capacitor 90, and trimmer condenser 92. The oscillator enregy from compartment 30 is coupled to mixer compartment 28 by means of a coupling loop 66, in longitudinally extending common partition wall 68.

The IF frequency output from mixer stage 28 is presented to coaxial cable conductor 95. The IF tuning is obtained by feed-through condenser 94 and inductor 97, which are selected in conjunction with the impedance of the coaxial cable 95 to provide the desired fixed IF frequency.

In accordance with our invention, all the circuit components are mounted to the single sub-assembly 22, which is formed of a single stamping 110 as shown in FIGS. 8–11. Stamping 110 is of a generally double T-like configuration, with the partition walls 54, 68 forming the double legs of the T and the top wall 100 forming the arms of the T. This stamping is simply formed by three bends, shown as 111, 112 and 113 respectively (FIG. 9), after the generally rectangular sheet material is appropriately die-stamped to form the required mounting and coupling apertures. Right angle fold 111 defines the intersection of the top wall 100 and the spanning rear wall 114 of the central compartment 28. Right angle bends 112 and 113 respectively define the intersection of the partition walls 54, 68 and the rear wall 114 of the central compartment 28.

The various electrical components are then mounted to stamping 110 to provide the integral sub-assembly as shown in FIGS. 6 and 7. It is especially important to note that during this assembly operation the location of all the electrical components will be in relatively accessible regions, thereby facilitating the manufacture thereof. This sub-assembly may then be tested completely prior to interconnection with stamping 120, which serves to define the remaining end and rear boundaries of the compartments. Stamping 120 is similarly formed of a single sheet of material, appropriately die-cut and folded at 122, 123 and 124, to form end walls 102, 104 and bottom wall 106 respectively, with the connecting material providing the rear wall 125 of the compartments.

The assembled double T primary sub-assembly 22 is then inserted within sub-assembly 24 with: locating tabs 128, 130 at the upper end of end walls 102, 104, extending in cooperating slotted apertures 129, 131 of top wall 100; rearwardly projecting tab portions 140, 144, 146 of partition walls 54, 68 engaging cutouts 141, 145 and 147 respectively of the stamping 120; downwardly projecting tab portions 148 of the partition walls entering slots 149 of the bottom wall, and rearwardly extending portions 44', 56' of inductance lines 44, 56 entering openings 44'', 56'', respectively. The sub-assemblies are then connected together, as by soldering, and front cover 21 snapped on as by spring fingers 99, to complete the assembly. It should be noted that in the fully assembled unit a number of the electrical circuit components (e.g., 70, 74, 76, 84 and 97) will be quite inaccessible as compared to their open location during the fabrication of the sub-assembly.

Reference is now made to FIGS. 16–26, which show another UHF tuner construction in accordance with the novel sub-assembly concept of our invention. The electrical circuit arrangement, and components of this embodiment, generally correspond to the system embodiment of FIGS. 1–15, which has previously been discussed in detail. Accordingly, for the sake of brevity, a detailed discussion of the circuit components will be omitted, with it being understood that this embodiment, as well as the previous embodiment, is not limited to the specific circuit shown in FIG. 5, but may be practiced in conjunction with various modifications of the UHF tuning circuitry. The ensuing discussion will therefore be limited to the specific manner in which the sub-assembly constructions differ from that previously described.

Tuner 200 includes two principal sub-assemblies: 222 and 224, with all the electrical circuit components being mounted to sub-assembly 222.

The fully assembled tuner, as shown in FIG. 17, includes antenna input compartment 226, mixer compartment 228 and oscillator compartment 230. These compartments are provided by the nested inter-engagement of the wall portions provided by the stampings 150, 180, which form the respective housing sub-assemblies.

Principal stamping 150, to which are mounted all the electrical circuit components, includes the partition wall 156 (intermediate the oscillator and mixer compartments); the farthest battery end wall 154; at least a portion of partition wall 157; and a portion 159 of the rear wall. Stamping 180 includes the remaining portion 157' of the partition wall intermediate the antenna input section 226 and mixer section 228; the end boundary wall 182; and the remaining portion 159' of the rear wall.

Referring to the principal sub-assembly, the rotor plates of ganged capacitor are carried by rotatable rod 243, mounted in openings 160, 162 of walls 154, 156 respectively; and the stator rod 245 is mounted in aperture 164 of wall 156; and semi-circular recess 166 of wall portion 157.

In order to guide the inter-engagement of the assemblies, an extensive slotted opening 260 is provided along the location of partition wall 157, which, in the final assembled position, contains base region 262 of partition wall 157'. It should also be noted that as wall sections 157 and 157' inter-engage (see FIG. 19), they leave an opening 252, which serves as the energy coupling aperture between the antenna input section 226 and mixer section 228.

In accordance with another advantageous aspect of this embodiment, the upturned wall portion 157 of principal stamping 150 is formed by cutout portion 170 of the rear wall. This cutout portion is, however, covered by the solid expanse of rear wall portion 159', thereby insuring an enclosed compartment.

To further insure the proper inter-engagement of the sub-assemblies, stamping 180 includes upwardly extending tab portions 201, 203, which enter slotted openings 204, 205 of the first assembly top wall; and a top wall ear 188, which includes guide edge 189 for partition wall 156.

The bottom wall 206 of the compartments is shown provided by cover 221. Alternatively, this bottom wall may be provided by the second sub-assembly 224 in the general manner shown in conjunction with the embodiments of FIGS. 1–15. Cover 221 includes spring fingers 207, which grasp the lower rear portion of the inter-engaged principal sub-assemblies, as well as spring fingers 208, which grasp the upper forward portion of the assembly, so as to securably maintain the cover.

It is therefore seen that our invention provides UHF tuner assemblies, of the sub-assembly concept, in which all the electrical circuit components are mounted to a single sub-assembly, with this sub-assembly inter-engaging another sub-assembly to provide the desired compartmentalized isolation of the tuner stages. Although two illustrative embodiments have been shown as exemplary of the invention, it should be understood that other modifications may be made within the concept of the invention, which is set forth in the following claims.

The embodiments of the invention in which an exclusive privilege or property is claimed are defined as follows:

1. A UHF tuner assembly for receiving input signals over a predetermined range of frequencies and heterodyning the signals down to a substantially lower common receiver I-F frequency; said tuner assembly including a housing chassis for supporting individual circuit components connected to comprise antenna-input, mixer and oscillator stages, characterized in that said housing chassis includes at least first and second mating sub-assemblies capable of being cooperatively interengaged to define three separate shielded compartments longitudinally extending in adjacent side-by-side arrangement, said compartments defined in part by spaced first, second, third and fourth parallel longitudinal compartmental walls; said first and fourth longitudinal compartmental walls comprising exterior housing side walls, each such compartment having therein the circuit components comprising a separate one of said stages; said first sub-assembly comprising a single piece of sheet metal and including a top exterior housing wall and a first pair of said longitudinal compartmental walls merging perpendicularly to said top exterior wall at spaced portions thereof, all of said circuit components being mounted to said first sub-assembly; said second sub-assembly comprising a single piece of sheet metal including a second pair of said longitudinal compartmental walls.

2. A UHF tuner assembly in accordance with claim 1 wherein said first pair of longitudinal compartmental walls comprise said second and third longitudinal compartmental walls, said second pair of said longitudinal compartmental walls comprising said first and fourth longitudinal compartmental walls.

3. A UHF tuner assembly according to claim 2 wherein said circuit components include a multi-ganged variable condenser including stator and rotor sections in each of said compartments; said variable condenser having first support means for supporting the stator blades thereof, and second support means for supporting the rotor blades thereof; said first and second support means being mounted to said second and third longitudinal compartmental wall portions of said first sub-assembly to provide an integral unit including the multi-ganged variable condenser and all of the associated circuit components for the antenna-input, mixer and oscillator stages.

4. A UHF tuner assembly according to claim 2 wherein said second sub-assembly further includes a bottom housing wall merging perpendicularly to all of said longitudinal compartmental walls at the bottom end region thereof to define the bottom end boundaries of said compartments; and a housing rear-wall interconnecting said first and fourth longitudinal compartmental walls to define the rear end boundaries of said compartments.

5. A UHF tuner assembly for receiving input signals in the range of 470 to 890 mc. and heterodyning the signals down to a substantially lower common receiver I-F frequency; said tuner comprising antenna-input, mixer and oscillator stages, each of said stages including circuit components mounted to a housing chassis; said housing chassis including at least first and second sub-assemblies, nested together to form first, second and third shielded compartments, longitudinally extending in adjacent side-by-side arrangement; said first compartment containing the antenna-input circuit components, said second compartment containing the mixer circuit components and said third compartment containing the oscillator circuit components; a first longitudinal wall forming the side boundary of said first compartment, a second longitudinal wall forming a common partition wall between said first and second compartments, a third longitudinal wall forming a common partition wall between said second and third compartments, and a fourth longitudinal wall forming the side boundary of said third compartment; a top wall extending perpendicular to said longitudinal walls and intersecting the top end regions of each of said longitudinal walls to form the top end boundaries of said compartments; said first sub-assembly including said top wall and preselected portions of said longitudinal walls; all of the circuit components of said antenna-input, mixer and oscillator stages mounted to said first sub-assembly while disassociated from said second sub-assembly and positioned thereon to provide substantial accessibility of all of said circuit components during mounting and electrical connections thereof; said second sub-assembly including the remaining portions of said longitudinal walls; and means for cooperatively interconnecting said first and second sub-assemblies for establishing said compartments, with at least some of the circuit components mounted to said first sub-assembly then being positioned at a substantially inaccessible compartment location; said first sub-assembly including one of the compartment partition walls and one of the boundary end walls, said last-named one being further removed from said one of the compartment partition walls than the other of the boundary end walls; said second sub-assembly including the other boundary end wall and at least a portion of the other partition wall.

6. A UHF tuner assembly for receiving input signals in the range of 470 to 890 mc. and heterodyning the signals down to a substantially lower common receiver I-F frequency; said tuner comprising antenna-input, mixer and oscillator stages, each of said stages including circuit components mounted to a housing chassis; said housing chassis including at least first and second sub-assemblies, nested together to form first, and second and third shielded compartments, longitudinally extending in adjacent side-by-side arrangement; said first compartment containing the antenna-input circuit components, said second compartment containing the mixer circuit components and said third compartment containing the oscillator circuit components; a first longitudinal wall forming the side boundary of said first compartment, a second longitudinal wall forming a common partition wall between said first and second compartments, a third longitudinal wall forming a common partition wall between said second and third compartments, and a fourth longitudinal wall forming the side boundary of said third compartment; a top wall extending perpendicular to said longitudinal walls and intersecting the top end regions of each of said longitudinal walls to form the top end boundaries of said compartments; said first sub-assembly including said top wall and preselected portions of said longitudinal walls; all of the circuit components of said antenna-input, mixer and oscillator stages mounted to said first sub-assembly while disassociated from said second sub-assembly and positioned thereon to provide substantial accessibility of all of said circuit components during mounting and electrical connections thereof; said second sub-assembly including the remaining portions of said longitudinal walls; and means for cooperatively interconnecting said first and second sub-assemblies for establishing said compartments, with at least some of the circuit components mounted to said first sub-assembly then being positioned at a substantially inaccessible compartment location; said first sub-assembly including said first and third longitudinal walls; said second sub-assembly including said fourth longitudinal wall and at least a portion of said second longitudinal wall.

7. A UHF tuner assembly as set forth in claim 6: a coupling opening in said second longitudinal wall for coupling a predetermined portion of the electrical energy between said antenna-input and mixer compartments; said first sub-assembly including a first portion of said second wall and said second sub-assembly including a second portion of said second wall; the inter-engagement of said first and second portions defining said coupling opening.

8. A UHF tuner assembly as set forth in claim 7: each of said first and second sub-assemblies formed of a single piece of sheet metal, having a right angle bend at the intersection of its respective walls; said first sub-assembly including a first rear wall section standing between said first and third longitudinal walls; said second sub-assembly including a second rear wall section spanning between said second and fourth longitudinal walls; said first wall portion of said second wall formed of an upturned and removed area of said first rear wall section; said second rear wall section overlapping said first rear wall section, for covering said removed area.

9. A UHF tuner assembly as set forth in claim 6: said sub-assemblies including guide means at the location of said second longitudinal wall for guiding the nested placement of said second sub-assembly, such that said first and second wall portions lies in a common plane.

References Cited

UNITED STATES PATENTS

| | | | |
|---|---|---|---|
| 2,878,378 | 3/1959 | Carlson | 334—85 X |
| 3,187,281 | 6/1965 | Weiner et al. | 325—357 |
| 3,284,730 | 11/1966 | Pitt et al. | 334—85 X |
| 3,365,621 | 1/1968 | Von Fange et al. | 317—101 |

ROBERT L. GRIFFIN, Primary Examiner

B. V. SAFOUREK, Assistant Examiner

U.S. Cl. X.R.

317—101; 325—461; 334—85